United States Patent [19]
Richardson et al.

[11] Patent Number: 5,778,727
[45] Date of Patent: Jul. 14, 1998

[54] HEADED SPINDLE PIN FOR WOBBLE-TYPE SICKLE DRIVE

[75] Inventors: Craig Allen Richardson; James C. Walters; Jerry Lee Krafka; Daniel J. Goodman, all of Ottumwa, Iowa

[73] Assignee: Deere & Company, Moline, Ill.

[21] Appl. No.: 693,628

[22] Filed: Aug. 8, 1996

[51] Int. Cl.[6] ............................................. F16H 23/04
[52] U.S. Cl. ............................................. 74/60; 56/296
[58] Field of Search ................................ 74/60; 56/296, 56/208; 403/79, 157, 153, 150, 158

[56] References Cited

U.S. PATENT DOCUMENTS

| | | | |
|---|---|---|---|
| 1,759,445 | 6/1930 | Edwards | 403/79 X |
| 3,104,511 | 9/1963 | Clark | 74/60 X |
| 3,823,534 | 7/1974 | Bornzin et al. | 74/60 X |
| 4,402,174 | 9/1983 | Boone | 74/60 X |

*Primary Examiner*—Rodney H. Bonck
*Assistant Examiner*—William C. Joyce

[57] ABSTRACT

A wobble drive for imparting reciprocating motion to a sickle bar includes a wobble drive shaft rotatable about a first axis and having a cylindrical wobble section formed about an axis making an angle of about 14.5° to the first axis. A toroidal wobble shaft bearing housing is mounted on the wobble section by a set of wobble bearings having their outer races pressed into the bearing housing. An output yoke is coupled to the wobble shaft bearing housing for transmitting the oscillatory motion of the housing, caused by rotation of the drive shaft, to a swing arm fixed to an end of a shaft portion of the yoke. The coupling of the yoke to the wobble bearing housing is accomplished by a pair of headed spindle pins inserted, from the inside out, through pin bores provided at diametrically opposite locations in the wobble shaft bearing housing, and into respective yoke bearings mounted in the ends of a pair of yoke limbs that are joined to the yoke shaft portion. The heads of the spindle pins are respectively received in counterbored sections at the radially inner ends of the pin bores and these counterbores are blocked by outer races of the set of wobble bearings carried by the wobble bearing housing. The pins are each stepped to form first and second sections of different diameters with the radially inner section being larger than the radially outer section and sized for an interference fit with the bearing housing and with the radially outer sections being longer than the pin bores so as to permit the pins to be freely manually inserted through the pin bores and partially into the pin bearings carried by the yoke limbs, whereby the bearing housing and output yoke may be properly aligned one with the other prior to the pins being mechanically pressed into the pin bores.

2 Claims, 3 Drawing Sheets

5,778,727

HEADED SPINDLE PIN FOR WOBBLE-TYPE SICKLE DRIVE

BACKGROUND OF THE INVENTION

The present invention relates to drives for cutting elements of platforms or headers of crop harvesting machines and more specifically relates to a drive for a sickle knife.

Platforms of crop harvesting machines, such as windrowers and mower-conditioners, are often equipped with a cutterbar utilizing a reciprocating sickle knife for cutting crop. A common way for deriving this reciprocating motion is through the use of a so-called wobble drive. In accordance with a known wobble drive, a wobble drive shaft is rotatably mounted in a fluid tight case for rotation about a first axis and includes a central cylindrical portion formed about a wobble axis angled relative to the first axis. A toroidal shaped wobble shaft bearing housing is mounted to said central cylindrical portion by a set of tapered roller bearings, whereby rotation of the wobble drive shaft causes the bearing housing to oscillate about a second axis disposed perpendicular to the first. This oscillating motion is transferred to the exterior of the case by an output yoke having a pair of limbs pinned to diametrically opposite locations of the wobble shaft bearing housing shaft and having an output shaft located along the second axis and projecting through and being mounted for oscillating in a wall of the case. A swinger arm is mounted between the yoke output shaft and a head assembly of a sickle knife of a cutterbar to be reciprocated in response to oscillation of the yoke shaft.

A problem with wobble drives of this type has been that the spindle pins connecting the yoke limbs to the wobble shaft bearing housing tend to migrate from their mounting holes resulting in a catastrophic failure in the knife drive case. One attempt at solving this problem has been to provide a set screw for engaging a groove formed in the pin. This of course requires an extra part and relies on the set screw remaining seated in the groove to be effective.

SUMMARY OF THE INVENTION

According to the present invention, there is provided an improved wobble drive for driving a sickle bar and, more specifically, there is provided a reliable connection between the wobble shaft bearing housing and output yoke of such a wobble drive.

An object of the invention is to provide a connection pin arrangement resulting in the wobble shaft housing of a wobble drive being pinned to the output yoke in a manner preventing the pins from migrating outwardly.

Yet a more specific object of the invention is to provide a wobble drive, as set forth in the previous object, wherein the spindle pins connecting the wobble drive bearing housing to the output yoke project radially outwardly through bores provided in the housing and into bearings carried by the yoke and are provided with radially inwardly located heads or shoulders preventing radially outward migration of the pins.

Another object of the invention is to provide pins for connecting the wobble housing of a wobble drive to the yoke of such a drive having heads as set forth in the immediately preceding object and to have the radially inward ends of the pins disposed in a counterbore closed by outer races of bearings pressed into the wobble shaft bearing housing.

Yet a more specific object of the invention is to provide a wobble drive incorporating spindle pins having heads set forth in one or more of the foregoing objects, with the pins further being stepped in diameter along their lengths such that smaller diameter end the pins may be freely manually inserted, from the inside out, through bores in the bearing housing and then partly into bearings carried by the yoke limbs so as to place the bearing housing and yoke in proper alignment with each other for having the larger diameter sections of the pins pressed into the bores of the bearing housing.

These and other objects of the invention will become apparent from a reading of the ensuing description together with the appended drawings.

DESCRIPTION OF THE PREFERRED EMBODIMENT

Figure 1:
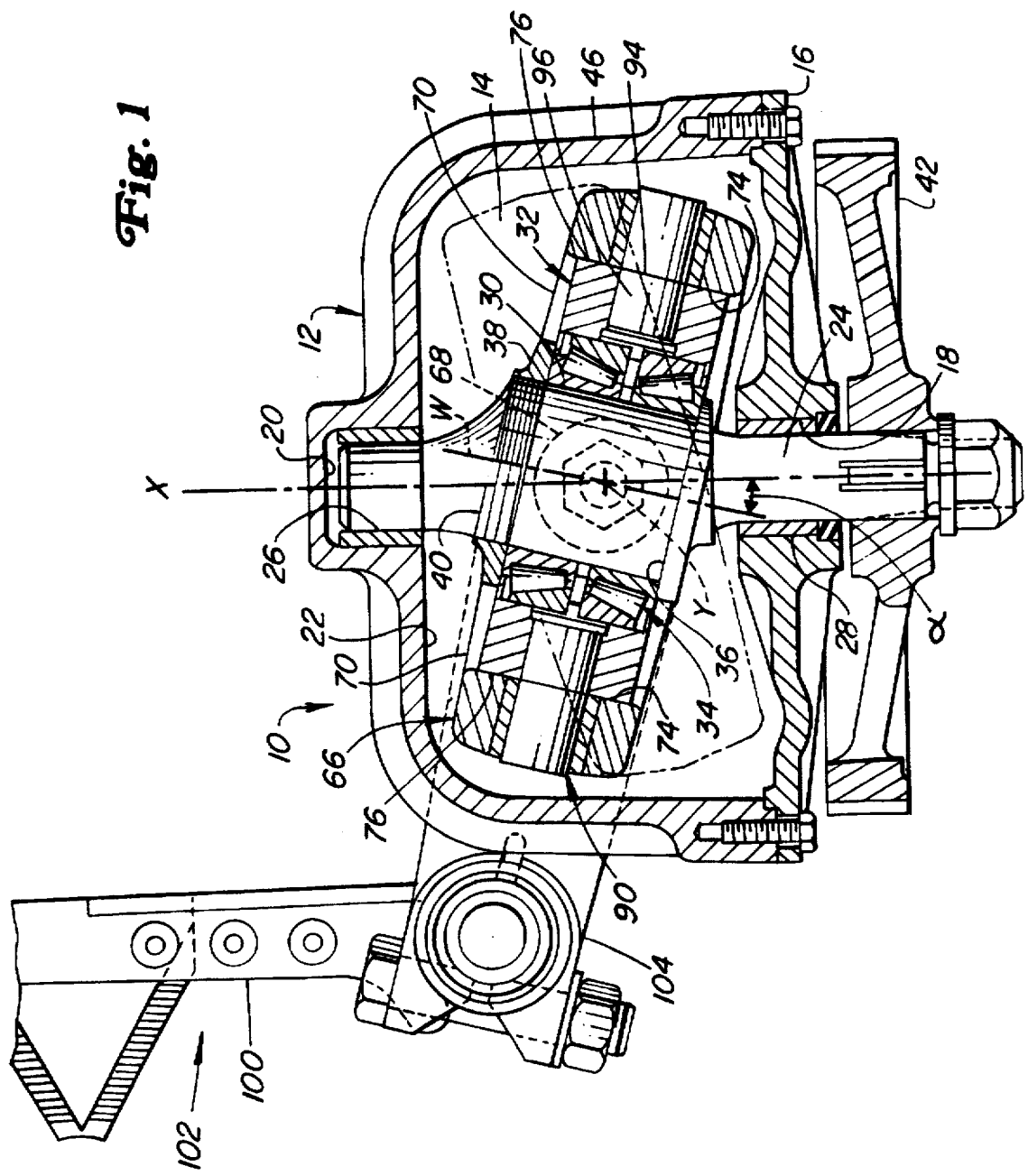
FIG. 1 is top plan view of a wobble drive, with the drive case being shown in horizontal section taken along the wobble drive shaft axis of rotation, as it would appear at the left side of a header for driving a sicklebar.
Figure 2:
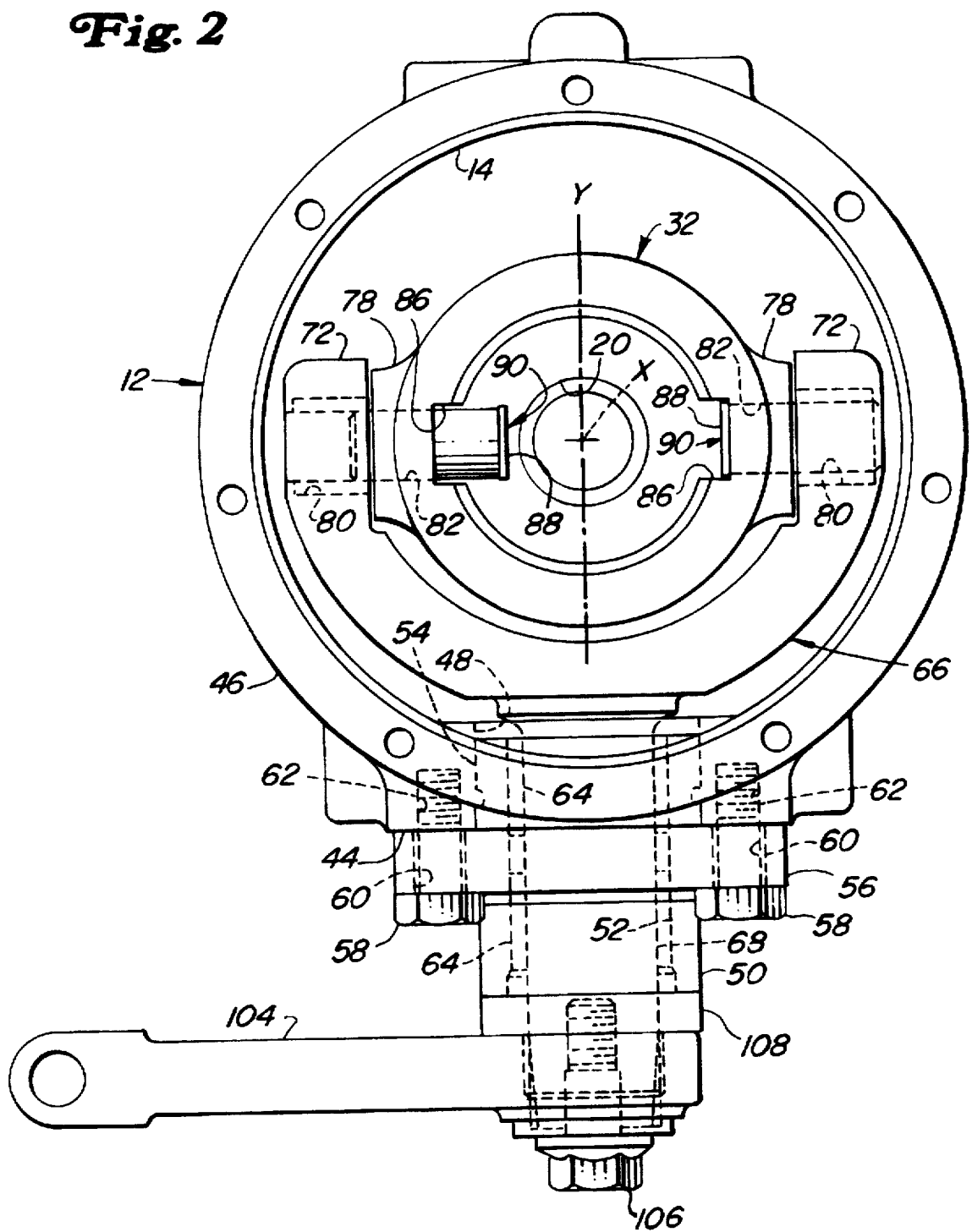
FIG. 2 is a left side elevational view of the wobble drive case shown in FIG. 1, but showing the drive case cover plate, wobble shaft and wobble shaft bearing removed for clarity, and showing one of the yoke-to-bearing housing connecting pins in a partly installed condition.

Referring now to FIGS. 1 and 2, there is shown a wobble drive 10 including a fluid tight case 12 defining a cavity 14 which may be accessed by removing a cover plate 16 forming one of the case walls. A bore 18 extends through the plate 16 and aligned with the bore 18 along an axis X is a cup-like recess 20 provided in a case wall 22 located on the opposite side of the cavity 14 from the plate 16. A wobble drive shaft 24 is located along the axis X and extends across the cavity 14 from the recess 20 in the wall 22 and through the bore 18 in the plate 16, with the drive shaft being supported for rotation about the axis X by a bearing 26 located in the recess 20 and by a bearing 28 located in the bore 18. The drive shaft 24 includes an enlarged, central cylindrical wobble section 30 formed about a wobble axis W disposed at an angle α of about 14.5° to the axis X.

A toroidal shaped wobble shaft bearing housing 32 is rotatably supported on the wobble section 30 of the drive shaft 24 by a set of tapered roller bearings 34. One of the set of bearings 34 is positioned against a shoulder 36 formed at one end of the cylindrical wobble section 30, and a capture nut 38 is received on a threaded portion 40, at an opposite end of the cylindrical wobble section 30 from the shoulder 36, and is in tight engagement with the other one of the set of bearings for holding the assembled housing 32 and bearings 34 in place. Fixed to an end of the drive shaft 24, as by a splined connection, is a toothed pulley 42 forming part of a drive (not shown) for imparting rotation to the shaft 24 and, when operating in conjunction with a wobble drive mounted on an opposite side of the platform for driving a separate sickle knife, typically including a cogged belt engaged with the pulley 42. Thus, it will be appreciated that rotation of the shaft 24 will result in the wobble shaft bearing housing 32 oscillating about an axis Y disposed at a right angle to the axis X.

As can best be seen in FIG. 2, a planar mounting surface 44 is formed in perpendicular transverse relationship to the axis Y at an exterior location on a generally cylindrical wall 46 of the case 12, the generally cylindrical wall 46 extending between the case cover plate 16 and wall 22. A bore 48 extends through the wall 46 along the axis Y and has an outer end located centrally within the mounting surface 44. A generally cylindrical, tubular bearing housing 50 includes a bearing bore 52 disposed along the axis Y and includes an end section 54 received in and closing the case bore 48. Forming an integral part of the housing 50 is a mounting flange 56 clamped against the mounting surface 44 by a set of four set screws 58 respectively inserted through a set of four holes 60 arranged in a rectangular pattern in the flange 56 and being screwed into threaded blind bores 62 having open ends at the surface 44. It is to be noted that the length of the capscrews 58 would normally be longer than illustrated here for the purpose of clamping the drive case 12 to a drive case mounting plate, not shown, forming part a platform main frame and being clamped between the heads of the capscrews 62 and the mounting flange 56. Received in and spaced axially from each other within the bearing housing 50 are a pair of bearings 64.

Figure 3:
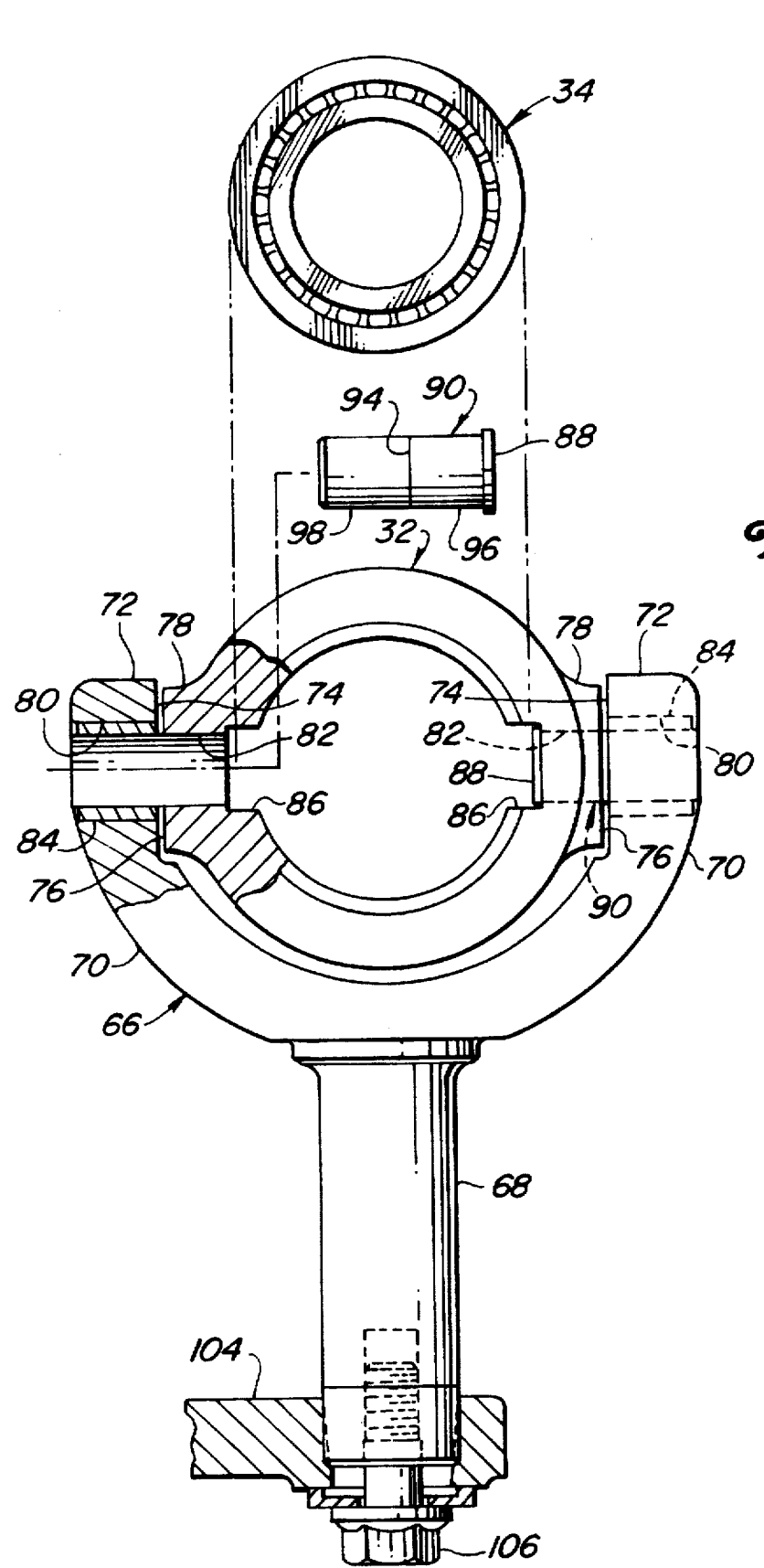
FIG. 3 is a view of one of the wobble drive yoke and bearing housing as they appear in FIG. 2, but additionally showing the wobble shaft bearing and one of the yoke-to-bearing housing connecting pins in exploded fashion and showing the area of connection of this one pin in section.

As can best be seen in FIG. 2, an output yoke 66 is provided for transferring the oscillating motion, imparted to the wobble shaft bearing housing 32, to the exterior of the case 12. Specifically, the yoke 66 includes an output shaft 68 disposed along the axis Y and projecting through and being rotatably mounted in the bearing housing 50 by the spaced bearings 64. Referring now also to FIG. 3, it can be seen that the yoke 66 further includes a pair of limbs 70 joined to an end of the shaft 68 and respectively including ends 72 having parallel, radially inwardly facing flat surfaces 74 respectively engaged with parallel radially outwardly facing flat surfaces 76 of respective hubs 78 formed at diametrically opposite side locations of the wobble shaft bearing housing 32. The yoke limb ends 72 are respectively provided with bores 80 extending radially, relative to the axis Y, and being disposed in axial alignment with a pair of bores 82 respectively provided in the hubs 78 of the bearing housing 32. A bearing or bushing 84 is pressed into each of the yoke limb bores 80.

It is here noted that, to this point in the description, the structure of the wobble drive 10 is substantially the same as that of a prior art wobble drive. The present invention resides in the manner of connecting the bearing housing 32 to the yoke 66.

Specifically, radially inner ends of each of the bearing housing hub bores 82 are counterbored, as at 86, for accommodating an enlarged head or shoulder 88 of a spindle pin 90 inserted from the inside out through each of the bores 82 and into the aligned yoke bearing 84. The wobble shaft bearing housing 32 and yoke 66 are thus assembled together with the pin heads 88 preventing the pins 90 from migrating outwardly during operation of the wobble drive 10.

As can best be seen in FIG. 3, each pin 90 is stepped, as at 94, so as to divide the pin lengthwise into large and small diameter sections 96 and 98, respectively. The pin section 96 is sized for establishing a tight press fit with the wobble bearing housing 32. The length and diameter of the pin section 98 is such that it may be freely manually inserted through a respective wobble housing bore 82 and a short distance into the adjacent yoke bearing 84 (see position of left-hand pin 90 in FIG. 2), thereby placing the yoke and housing assembly in proper alignment for the pins 90 to be mechanically pressed into the housing bores 82. It is here noted that once the yoke 66 and housing 32 are assembled, the set of tapered roller bearings 34 will be pressed into the housing 32 with outer races of the bearings 34 cooperating to block the counterbore 86 for preventing the pins 90 from moving radially inwardly from the bores 82.

With the yoke 66 assembled to the wobble bearing housing 32, and with the housing 32 mounted on the wobble section 30 of the wobble drive shaft 24, that rotation of the shaft 24 will result in oscillation of the yoke shaft 68. Connected between an end of the yoke shaft 68 and a head assembly 100 of a sicklebar 102 is a swing arm 104 mounted to effect reciprocation of the sicklebar 102 in response to oscillation of the yoke shaft 68. Specifically, an end of the arm 104 is forced onto a tapered splined end of the yoke shaft 68 by a capscrew 106 received in a tapped bore extending along the axis of the shaft 68. A felt washer 108 is captured between the arm 104 and the bearing housing 50 and acts to exclude dirt from the interior of the bearing housing 50.

The operation of the wobble drive 10 is thought to be understood from the foregoing. Suffice it to say that the headed spindle pins 90, inserted from the inside out for interconnecting the bearing housing 32 and yoke 66, establish a reliable connection since the pin heads 88 and outer races of the bearings 34 hold the pins in place; and further, that the stepped pins 90 make it possible to manually insert the pins through the bearing housing bores 82 and far enough into the yoke bearings 84 to correctly align the bearing housing 32 and yoke 66 for having the pins pressed mechanically into the bearing housing bores 82.

We claim:

1. In a wobble drive including a wobble drive shaft supported for rotating about a first axis and having a cylindrical wobble section formed about a second axis disposed at an angle to said first axis, a toroidal wobble shaft bearing housing mounted to said wobble section by a set of wobble bearings, and an output yoke including a yoke shaft, supported for rotation about a third axis extending perpendicular to said first axis, and joined to a pair of limbs having respective ends disposed against diametrically opposite locations of said wobble shaft bearing housing, each limb end being provided with a bearing bore extending radially relative to said third axis, a pair of pin bores being respectively provided in said bearing housing at said diametrically opposite locations in axial alignment with a respective bearing bore, a yoke bearing being received in each bearing bore, and a spindle pin being received in each yoke bearing and the adjacent pin bore, whereby rotation of said wobble drive shaft will cause oscillation of said wobble shaft bearing housing and, hence, of said yoke, an improved spindle pin connection between said pair of yoke limbs and said wobble shaft bearing housing, comprising: each spindle pin having an enlarged head at a radially inner end thereof preventing outward migration of said pins from said pin bore and yoke bearing; each of said pin bores including a counterbored section receiving the enlarged head of a respective one of the spindle pins; and said set of wobble bearings having outer races located in said bearing housing in respective positions wherein they cooperate to cover said counterbored sections of said pin bores, whereby said spindle pins are prevented from moving axially inwardly in said pin bores.

2. In a wobble drive including a wobble drive shaft supported for rotating about a first axis and having a cylindrical wobble section formed about a second axis disposed at an angle to said first axis, a toroidal wobble shaft bearing housing mounted to said wobble section by a set of wobble bearings, and an output yoke including a yoke shaft, supported for rotation about a third axis extending perpendicular to said first axis, and joined to a pair of limbs having respective ends disposed against diametrically opposite locations of said wobble shaft bearing housing, each limb end being provided with a bearing bore extending radially relative to said third axis, a pair of pin bores being respectively provided in said bearing housing at said diametrically opposite locations in axial alignment with a respective bearing bore, a yoke bearing being received in each bearing bore, and a spindle pin being received in each yoke bearing and the adjacent pin bore, whereby rotation of said wobble drive shaft will cause oscillation of said wobble shaft bearing housing and, hence, of said yoke, an improved spindle pin connection between said pair of yoke limbs and said wobble shaft bearing housing, comprising: each spindle pin having an enlarged head at a radially inner end thereof preventing outward migration of said pins from said pin bore and yoke bearing; each of said spindle pins being stepped in diameter at a location between opposite ends of the spindle pin so as to establish a radially inner section having a first diameter and a radially outer section having a second diameter, with said first diameter being sized for establishing an interference fit with a respective pin bore, and with said second diameter being sized smaller than said first diameter for having a close fit with its associated yoke bearing; and said second section of said spindle pin having a length longer that a length of its associated pin bore, whereby, during assembly of the bearing housing to said yoke prior to installation of said set of wobble bearings, each spindle pin may be manually inserted freely through said associated pin bore and partly into said associated yoke bearing to thus properly align the bearing housing with the output yoke for having the pin mechanically pressed into the associated pin bore.

\* \* \* \* \*